(12) United States Patent
Woodham, Jr. et al.

(10) Patent No.: US 11,859,328 B2
(45) Date of Patent: Jan. 2, 2024

(54) APPLIANCE WITH LEAK DETECTION

(71) Applicant: Haier US Appliance Solutions, Inc., Wilmington, DE (US)

(72) Inventors: Richard Gary Woodham, Jr., Taylorsville, KY (US); Bryan James Beckley, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 614 days.

(21) Appl. No.: 17/016,562

(22) Filed: Sep. 10, 2020

(65) Prior Publication Data
US 2022/0074099 A1    Mar. 10, 2022

(51) Int. Cl.
| | | |
|---|---|---|
| D06F 33/47 | (2020.01) | |
| A47B 91/16 | (2006.01) | |
| D06F 23/04 | (2006.01) | |
| D06F 33/34 | (2020.01) | |
| D06F 34/05 | (2020.01) | |
| D06F 34/14 | (2020.01) | |
| D06F 34/28 | (2020.01) | |
| D06F 39/12 | (2006.01) | |

(Continued)

(52) U.S. Cl.
CPC ............. *D06F 33/04* (2013.01); *A47B 91/16* (2013.01); *D06F 23/04* (2013.01); *D06F 33/34* (2020.02); *D06F 34/05* (2020.02); *D06F 34/14* (2020.02); *D06F 34/28* (2020.02); *D06F 39/125* (2013.01); *G01M 3/186* (2013.01); *G08B 21/20* (2013.01); *D06F 2103/44* (2020.02); *D06F 2105/02* (2020.02); *D06F 2105/58* (2020.02)

(58) Field of Classification Search
CPC .......... D06F 33/47; D06F 23/04; D06F 33/34; D06F 34/05; D06F 34/14; D06F 34/28; D06F 39/125; D06F 2103/44; D06F 2105/02; D06F 2105/58; D06F 39/081; A47B 91/16; G01M 3/186; G08B 21/20; A47L 15/4253; A47L 2401/30; A47L 2501/01; A47L 2501/26; A47L 2501/32
See application file for complete search history.

(56) References Cited

U.S. PATENT DOCUMENTS 7,682,167 B2 * 3/2010 Martin .................... H01R 4/66
439/95
8,013,749 B2   9/2011 Murphy
(Continued)

FOREIGN PATENT DOCUMENTS

| CN | 209482003 U | * | 10/2019 | |
| CN | 209482003 U | | 10/2019 | |
| EP | 3586712 A1 | * | 1/2020 | ........... A47L 15/006 |

*Primary Examiner* — Curtis A Kuntz
*Assistant Examiner* — James E Munion
(74) *Attorney, Agent, or Firm* — Dority & Manning, P.A.

(57) ABSTRACT

Appliances configured to detect leaks and methods of detecting leaks are provided. The appliance includes a grounded chassis. The appliance also includes a first levelling leg electrically coupled to the chassis and a second levelling leg electrically isolated from the chassis. The appliance also includes a controller in operative communication with the second levelling leg and the chassis. The controller is configured for, and related methods include, monitoring electrical continuity between the second levelling leg and the chassis and detecting water on the base surface in response to electrical continuity between the second levelling leg and the chassis.

18 Claims, 7 Drawing Sheets

(51) Int. Cl.
*G01M 3/18* (2006.01)
*G08B 21/20* (2006.01)
*D06F 105/02* (2020.01)
*D06F 103/44* (2020.01)
*D06F 105/58* (2020.01)
*D06F 33/04* (2006.01)

(56) References Cited

U.S. PATENT DOCUMENTS

| | | |
|---|---|---|
| 9,603,503 B2 | 3/2017 | Chilcoat |
| 2008/0055112 A1 | 3/2008 | Gardner |
| 2017/0323551 A1* | 11/2017 | Tilley ............... G08B 21/20 |
| 2019/0094099 A1* | 3/2019 | Tinaphong ........... G08B 21/20 |

* cited by examiner

APPLIANCE WITH LEAK DETECTION

FIELD OF THE INVENTION

The present subject matter relates generally to household appliances which use water to perform domestic tasks, such as a refrigerator, dishwasher appliance or washing machine appliance, and more particularly to such appliances which are operable to detect leaks therefrom and related methods of detecting leaks.

BACKGROUND OF THE INVENTION

Household appliances are utilized for a variety of domestic tasks such as washing dishes, washing laundry, or storing and/or dispensing water, e.g., in liquid or solid (ice) form. For example, a water-using household appliance may be a laundry appliance, such as a washer and/or dryer, a kitchen appliance, such as a refrigerator or a dishwasher, or other household appliance such as a water treatment (e.g., softening) system.

Such household appliances are typically connected to a domestic water supply which contains water under pressure to provide such water on demand as needed by the appliance. For example, the appliance may include a valve which is automatically opened according to a preprogrammed operation of the appliance, such as a fill portion of a wash cycle in a washing machine appliance or a rinse cycle of a dishwasher appliance. The connection between the appliance and the water supply is generally hidden from view, e.g., the connection may be located behind or underneath the appliance, such as behind or underneath a housing or cabinet of the appliance. In some cases, a water leak may develop in this hidden area behind or underneath the cabinet of the appliance and the leak may not be noticed until enough leaked water has accumulated to reach a more visible area, such as in front of the appliance.

Accordingly, a household appliance with features for detecting leaked water underneath the appliance would be useful.

BRIEF DESCRIPTION OF THE INVENTION

Aspects and advantages of the invention will be set forth in part in the following description, or may be apparent from the description, or may be learned through practice of the invention.

In a first exemplary embodiment, an appliance is provided. The appliance includes a chassis comprising an electrically conductive material. The chassis is grounded, e.g., the chassis is electrically coupled to a ground. The appliance also includes a first levelling leg comprising an electrically conductive material. The first levelling leg is electrically coupled to the chassis. The first levelling leg is configured to support the appliance on a base surface. The appliance also includes a second levelling leg. The second levelling leg is electrically isolated from the chassis. The second levelling leg is configured to support the appliance on the base surface. The appliance also includes a controller in operative communication with the second levelling leg and the chassis. The controller is configured for monitoring electrical continuity between the second levelling leg and the chassis and detecting water on the base surface in response to electrical continuity between the second levelling leg and the chassis.

In a second exemplary embodiment, a method of detecting a leak from an appliance is provided. The appliance includes an electrically conductive chassis electrically coupled to a ground. The appliance also includes a first levelling leg electrically coupled to the chassis. The first levelling leg is configured to support the appliance on a base surface. The appliance also includes a second levelling leg electrically isolated from the chassis. The second levelling leg is configured to support the appliance on the base surface. The method includes monitoring electrical continuity between the second levelling leg and the chassis and detecting water on the base surface in response to electrical continuity between the second levelling leg and the chassis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
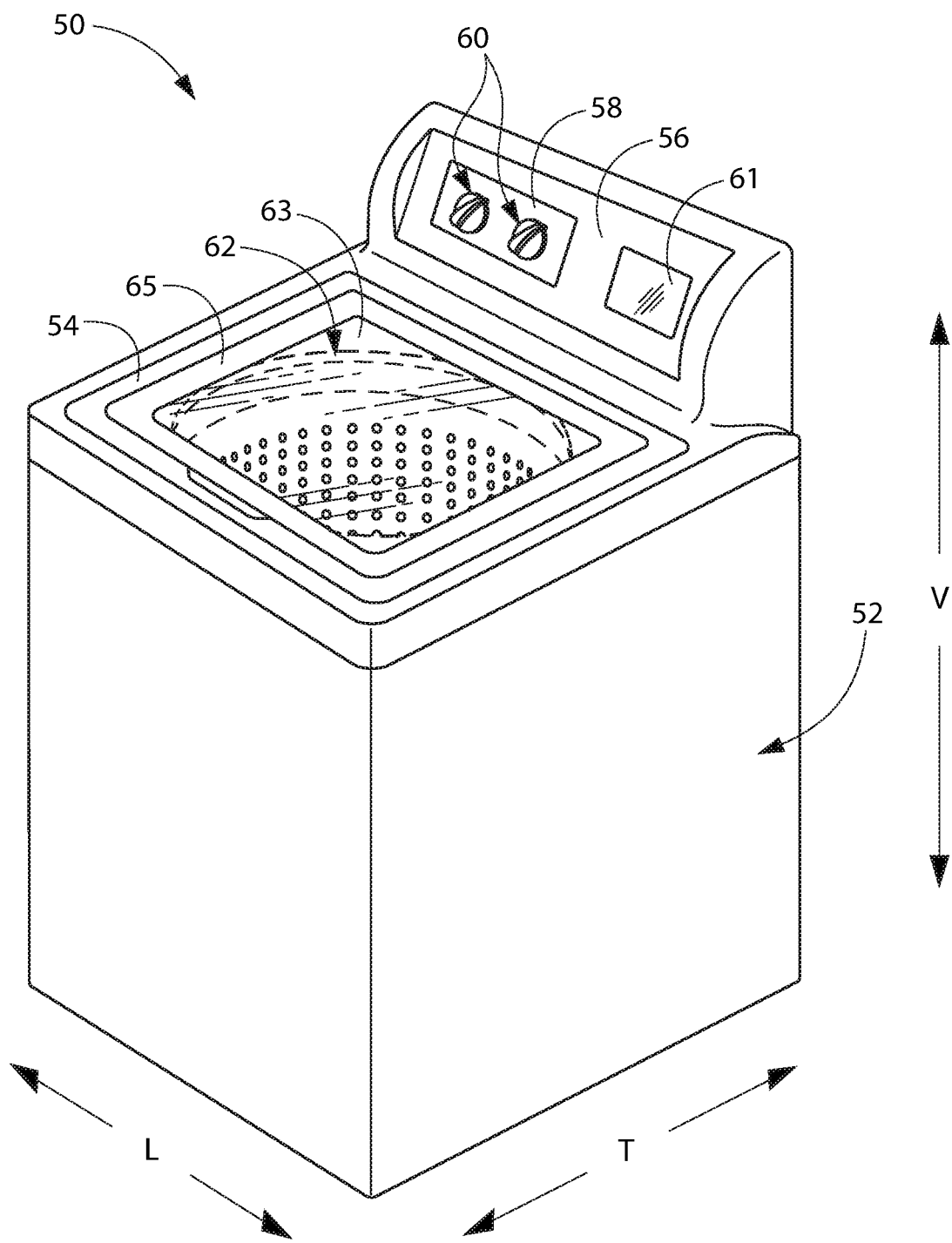
FIG. 1 provides a perspective view of a laundry appliance in accordance with one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
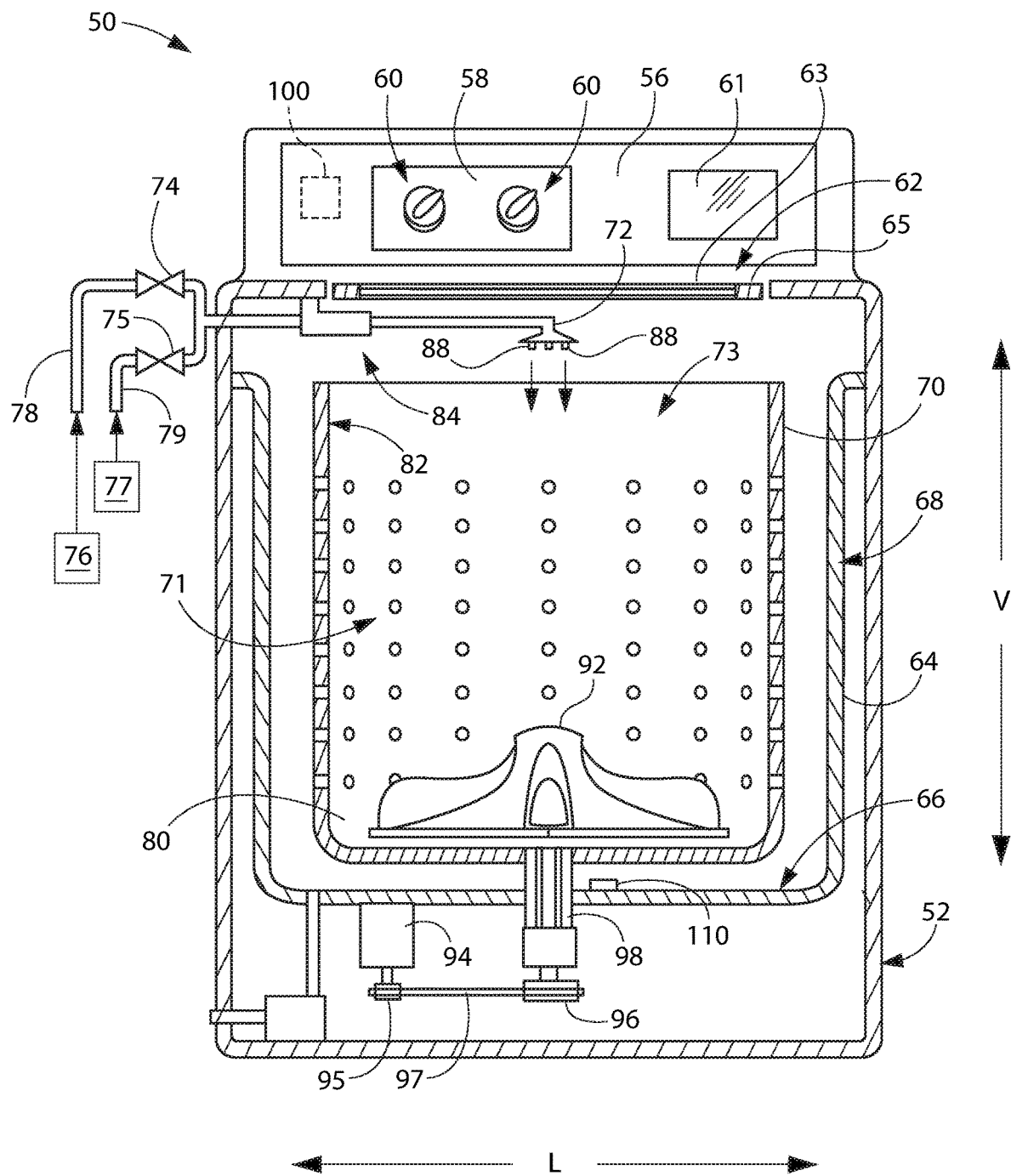
FIG. 2 provides a front, section view of the exemplary laundry appliance of FIG. 1.

A washing machine is illustrated in FIGS. 1 and 2 as an example of a water-using household appliance and is not intended to limit the present disclosure to washing machines. It should be understood that the present disclosure may be used with any of several various types of water-using or water-collecting appliances. As an example of a water-collecting appliance, the present disclosure may be useful for detecting overflow from a condensation pan of an air conditioner unit or a refrigerator appliance. Examples of water-using appliances, in addition to the washing machine of FIGS. 1 and 2, include dishwasher appliances and ice makers (either incorporated in a refrigerator appliance or stand-alone), among others. Thus, it is to be understood that the leak detecting features of the present disclosure may be incorporated into any of a variety of household appliances. It should be understood that "water," as used herein, includes water having solutes, e.g., electrolytes, dissolved therein, such as is typically found in domestic water supply systems.

FIG. 1 is a perspective view of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58, including a plurality of input selectors 60, is coupled to backsplash 56. The appliance 50 may define a vertical direction V, a lateral direction L, and a transverse direction T. The vertical, lateral, and transverse directions V, L, and T may be mutually perpendicular, such that an orthogonal coordinate system is formed.

Control panel 58 and input selectors 60 collectively form a user interface input for operator selection of machine cycles and features, and in one embodiment, a display 61 indicates selected features, a countdown timer, and/or other items of interest to machine users. It should be appreciated, however, that in other exemplary embodiments, the control panel 58, input selectors 60, and display 61, may have any other suitable configuration. For example, in other exemplary embodiments, one or more of the input selectors 60 may be configured as manual "push-button" input selectors, or alternatively may be configured as a touchscreen on, e.g., display 61.

A lid 62 is mounted to cover 54 and is rotatable between an open position (not shown) facilitating access to a tub, also referred to as a wash tub, 64 (FIG. 2) located within cabinet 52 and a closed position (shown in FIG. 1) forming an enclosure over tub 64. Lid 62 in exemplary embodiment includes a transparent panel 63, which may be formed of, for example, glass, plastic, or any other suitable material. The transparency of the panel 63 allows users to see through the panel 63, and into the tub 64 when the lid 62 is in the closed position. In some embodiments, the panel 63 may itself generally form the lid 62. In other embodiments, the lid 62 may include the panel 63 and a frame 65 surrounding and encasing the panel 63. Alternatively, panel 63 need not be transparent.

FIG. 2 provides a front, cross-section view of the exemplary washing machine appliance 50 of FIG. 1. As may be seen in FIG. 2, tub 64 includes a bottom wall 66 and a sidewall 68. A wash drum or basket 70 is rotatably mounted within tub 64. In particular, basket 70 is rotatable about a vertical axis V. Thus, washing machine appliance is generally referred to as a vertical axis washing machine appliance. Basket 70 defines a wash chamber 73 for receipt of articles for washing and extends, e.g., vertically, between a bottom portion 80 and a top portion 82. Basket 70 includes a plurality of openings or perforations 71 therein to facilitate fluid communication between an interior of basket 70 and tub 64.

A nozzle 72 is configured for flowing a liquid into tub 64. In particular, nozzle 72 may be positioned at or adjacent to top portion 82 of basket 70. Nozzle 72 may be in fluid communication with one or more water sources 76, 77 in order to direct liquid (e.g. water) into tub 64 and/or onto articles within chamber 73 of basket 70. Nozzle 72 may further include apertures 88 through which water may be sprayed into the tub 64. Apertures 88 may, for example, be tubes extending from the nozzles 72 as illustrated, or simply holes defined in the nozzles 72 or any other suitable openings through which water may be sprayed. Nozzle 72 may additionally include other openings, holes, etc. (not shown) through which water may be flowed, i.e., sprayed or poured, into the tub 64.

Various valves may regulate the flow of fluid through nozzle 72. For example, a flow regulator may be provided to control a flow of hot and/or cold water into the wash chamber of washing machine appliance 50. For the embodiment depicted, the flow regulator includes a hot water valve 74 and a cold water valve 75. The hot and cold water valves 74, 75 are utilized to flow hot water and cold water, respectively, therethrough. Each valve 74, 75 can selectively adjust to a closed position in order to terminate or obstruct the flow of fluid therethrough to nozzle 72. The hot water valve 74 may be in fluid communication with a hot water source 76, which may be external to the washing machine appliance 50. The cold water valve 75 may be in fluid communication with a cold water source 77, which may be external to the washing machine appliance 50. The cold water source 77 may, for example, be a commercial water supply, while the hot water source 76 may be, for example, a water heater. Such water sources 76, 77 may supply water to the appliance 50 through the respective valves 74, 75. A hot water conduit 78 and a cold water conduit 79 may supply hot and cold water, respectively, from the sources 76, 77 through the respective valves 74, 75 and to the nozzle 72.

An additive dispenser 84 may additionally be provided for directing a wash additive, such as detergent, bleach, liquid fabric softener, etc., into the tub 64. For example, dispenser 84 may be in fluid communication with nozzle 72 such that water flowing through nozzle 72 flows through dispenser 84, mixing with wash additive at a desired time during operation to form a liquid or wash fluid, before being flowed into tub 64. For the embodiment depicted, nozzle 72 is a separate downstream component from dispenser 84. In other exemplary embodiments, however, nozzle 72 and dispenser 84 may be integral, with a portion of dispenser 84 serving as the nozzle 72, or alternatively dispenser 84 may be in fluid communication with only one of hot water valve 74 or cold water valve 75. In still other exemplary embodiments, the washing machine appliance 50 may not include a dispenser, in which case a user may add one or more wash additives directly to wash chamber 73. A pump assembly 90 (shown schematically in FIG. 2) is located beneath tub 64 and basket 70 for gravity assisted flow to drain tub 64.

In some embodiments, for example as illustrated in FIG. 2, an agitation element 92 may be provided and may be oriented to rotate about the vertical direction V. As illustrated in FIG. 2, the basket 70 and agitation element 92 are driven by a motor 94, such as an induction motor, which is mechanically coupled to the basket 70. The motor may be mechanically coupled to the basket 70, e.g., via a drive pulley 95, a basket pulley 96, and a belt 97 as illustrated in FIG. 2. When the motor 94 is activated, the motor 94 rotates the drive pulley 95 and such rotation is transferred via the belt 97 to the basket pulley 96 which is joined to a motor output shaft 98. The basket pulley 96 may be integrally joined to the motor output shaft 98 or may be otherwise joined in any suitable manner. As motor output shaft 98 is rotated, basket 70 and agitation element 92 are operated for rotatable movement within tub 64, e.g., about vertical axis V. In other embodiments, the belt 97 may be directly connected to the basket 70, e.g., in a horizontal axis washing machine appliance. In additional exemplary embodiments, the motor may be mechanically coupled to the basket 70 and/or agitation element 92 without any belts or pulleys using a direct drive assembly. Various other forms of mechanical coupling may also be provided, such as via a mode shifter which selectively transfers rotation from the motor 94 to the basket 70 or the agitator 92. Such forms of mechanical coupling, e.g., a direct drive and/or mode shifter, are understood by those of skill in the art and, as such, are not illustrated in detail.

Various sensors may additionally be included in the washing machine appliance 50. For example, a pressure sensor 110 may be positioned in the tub 64 as illustrated or, alternatively, may be remotely mounted in another location within the appliance 50 and be operationally connected to tub 64 by a hose (not shown). Any suitable pressure sensor 110, such as an electronic sensor, a manometer, or another suitable gauge or sensor, may be utilized. The pressure sensor 110 may generally measure the pressure of water in the tub 64. This pressure can then be utilized to estimate the height or amount of water in the tub 64. Additionally, a suitable speed sensor can be connected to the motor 94, such as to the output shaft 98 thereof, to measure speed and indicate operation of the motor 94. Other suitable sensors, such as temperature sensors, water/moisture sensors, etc., may additionally be provided in the washing machine appliance 50.

Operation of washing machine appliance 50 is controlled by a processing device or controller 100, that is operatively coupled to the input selectors 60 located on washing machine backsplash 56 (shown in FIG. 1) for user manipulation to select washing machine cycles and features. Controller 100 may further be operatively coupled to various other components of appliance 50, such as the flow regulator (including valves 74, 75), motor 94, pressure sensor 110, speed sensor, other suitable sensors, etc. In response to user manipulation of the input selectors 60, controller 100 may operate the various components of washing machine appliance 50 to execute selected machine cycles and features.

Controller 100 is a "processing device" or "controller" and may be embodied as described herein. As used herein, "processing device" or "controller" may refer to one or more microprocessors, microcontroller, application-specific integrated circuits (ASICS), or semiconductor devices and is not restricted necessarily to a single element. The controller 100 may be programmed to operate dryer appliance 50 by executing instructions stored in memory. The controller may include, or be associated with, one or more memory elements such as for example, RAM, ROM, or electrically erasable, programmable read only memory (EEPROM). For example, the instructions may be software or any set of instructions that when executed by the processing device, cause the processing device to perform operations. Controller 100 can include one or more processor(s) and associated memory device(s) configured to perform a variety of computer-implemented functions and/or instructions (e.g. performing the methods, steps, calculations and the like and storing relevant data as disclosed herein). It should be noted that controllers 100 as disclosed herein are capable of and may be operable to perform any methods and associated method steps as disclosed herein.

While described in the context of specific embodiments of washing machine appliance 50, using the teachings disclosed herein it will be understood that washing machine appliance 50 is provided by way of example only. Other laundry appliances having different configurations (such as horizontal-axis washing machine appliances, or various clothes dryer appliances), different appearances, and/or different features may also be utilized with the present subject matter as well.

Figure 3:
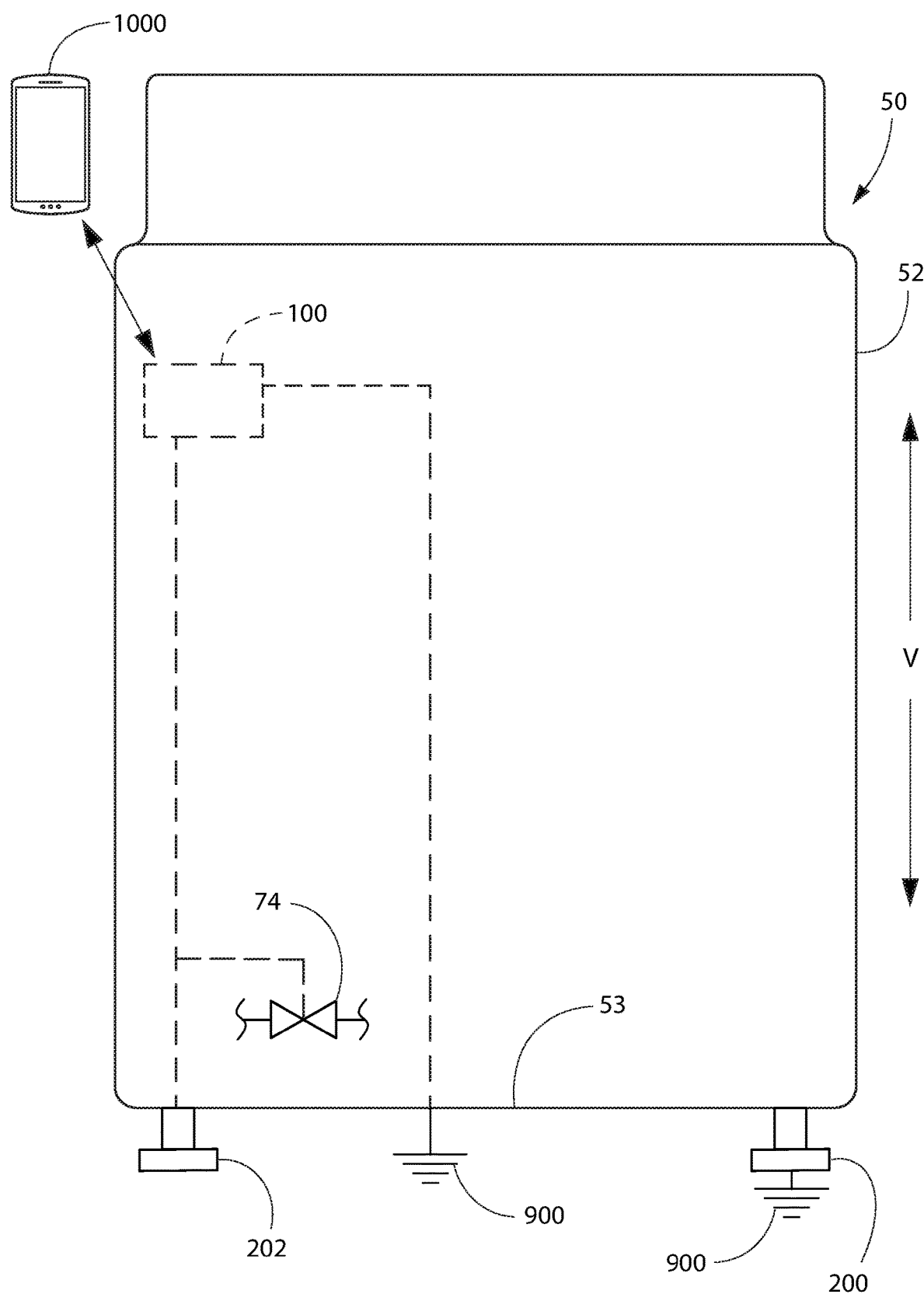
FIG. 3 provides a schematic view of an appliance in accordance with one or more example embodiments of the present disclosure.

Turning now to FIG. 3, a household appliance 50 is schematically illustrated, which may be, for example, the washing machine appliance illustrated in FIGS. 1 and 2, or may be any one of numerous other water-using or water-collecting appliances, e.g., a refrigerator, an ice maker, a dishwasher, or an air conditioner unit, as described above, among other possible example appliances. In FIG. 3 and subsequent FIGS, reference numbers for like or similar features, e.g., the cabinet 52, are repeated from FIGS. 1 and 2 for purposes of illustration only and without intending to limit such features to the washing machine features of FIGS. 1 and 2. For example, the cabinet 52 in FIG. 3 is not necessarily the cabinet of the washing machine illustrated in FIGS. 1 and 2, but may also or instead refer to a similar cabinet which is part of a dishwasher, refrigerator, etc.

As may be seen in FIG. 3, in some embodiments, the appliance 50 may include a plurality of levelling legs. For example, as illustrated in FIG. 3, the appliance 50 may include a first levelling leg 200 which is electrically grounded. In some exemplary embodiments, the first levelling leg 200 may be grounded in that the first levelling leg 200 is electrically connected to the ground 900 via another portion of the appliance 50, such as via a base frame or chassis 53 of the cabinet 52, where the chassis 53 is grounded and the first levelling leg 200 is electrically coupled directly to the chassis 53 (see, e.g., FIG. 6).

In some embodiments, the appliance 50 may also include a second levelling leg 202. As schematically depicted in FIG. 3, the controller 100 may be in operative communication with the second levelling leg 202. For example, such operative communication may include the second levelling leg 202 electrically coupled, such as through a wire as indicated by dashed lines in FIG. 3, to the controller 100 whereby the controller 100 can monitor or detect electrical properties or conditions of the second levelling leg 202.

Also as illustrated in FIG. 3, the controller 100 may be in operative communication with the grounded chassis 53 and a water supply valve 74 of the appliance 50. The water supply valve 74 of FIG. 3 may be the only or sole water supply valve in the appliance in some embodiments, or may be one of multiple water supply valves, such as the valves 74 and 75 in the exemplary appliance 50 in FIG. 2. In embodiments which include multiple water supply valves, e.g., as in FIG. 2, the controller 100 may be in operative communication with both or all of the water supply valves. The controller 100 may be in operative communication with the grounded chassis 53 in a similar manner as the second levelling leg 202, e.g., the controller 100 may be electrically coupled to the chassis 53 whereby the controller 100 can monitor or detect electrical properties or conditions of the chassis 53. For example, the controller 100 may be operable to monitor electrical continuity between the chassis 53 and the second levelling leg 202. The controller 100 may be in operative communication with the water supply valve 74 such that the controller 100 may actuate the valve 74, e.g., the controller 100 may open or close the water supply valve 74 to selectively permit or obstruct a flow of water into the appliance 50.

As mentioned above, the controller 100 may be in operative communication with the user interface of the appliance 50, such as the display 61 (FIG. 2) thereon. In some embodiments, the controller 100 may also or instead be in operative communication with a remote user interface 1000. For example, as depicted in FIG. 3, the controller 100 may communicate wirelessly with the remote user interface device 1000. The remote user interface device 1000 may include one or more of a smartphone, tablet, personal computer, wearable device (e.g., smart watch), a smart home system, or other similar user interface devices.

Figure 4:
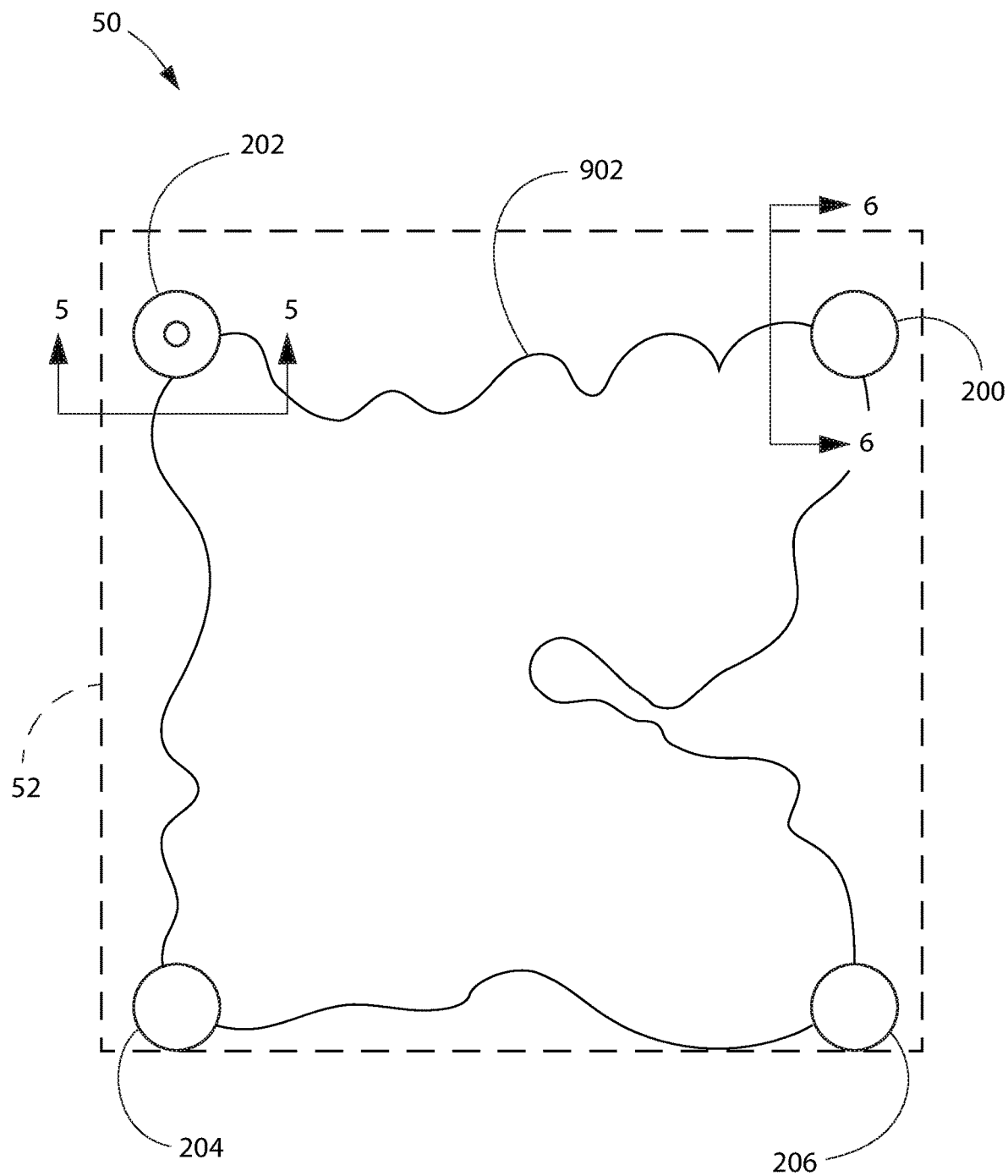
FIG. 4 provides a schematic plan view of the appliance of FIG. 3.

A schematic plan view of the appliance 50 according to one or more embodiments of the present disclosure is illustrated in FIG. 4. As illustrated in FIG. 4, in some embodiments, the appliance 50 may include a plurality of levelling legs, such as four levelling legs, e.g., the first levelling leg 200, the second levelling leg 202, a third levelling leg 204 and a fourth levelling leg 206. The third levelling leg 204 and the fourth levelling leg 206 may also be connected to the chassis 53 ground in the same manner as shown and described with respect to the first levelling leg 200. Thus, in some embodiments, the appliance 50 may be configured for and/or methods of detecting a leak may include detecting a leak between the second levelling leg 202 and any one or more of the first levelling leg 200, the third levelling leg 204, and the fourth levelling leg 206, as will be explained in more detail below.

As illustrated in FIG. 4, when a leak occurs, a puddle of water 902 may form underneath the appliance 50. The water 902 may extend between the second levelling leg 202 and at least one other levelling leg, while also not extending beyond the footprint of the cabinet 52 (which is indicated by a dashed line in FIG. 4, the cabinet 52 itself being positioned above the viewing plane). When the puddle of water 902 is thus obscured by the cabinet 52, the leak may be more difficult to detect. Accordingly, the appliance 50 may be configured for and/or methods according to the present disclosure may include detecting the leak based on electrical continuity with the second levelling leg 202, where the water in the water 902 places the second levelling leg 902 in electrical communication with the chassis 53 via the puddle of water 902 and at least one other levelling leg.

Figure 5:
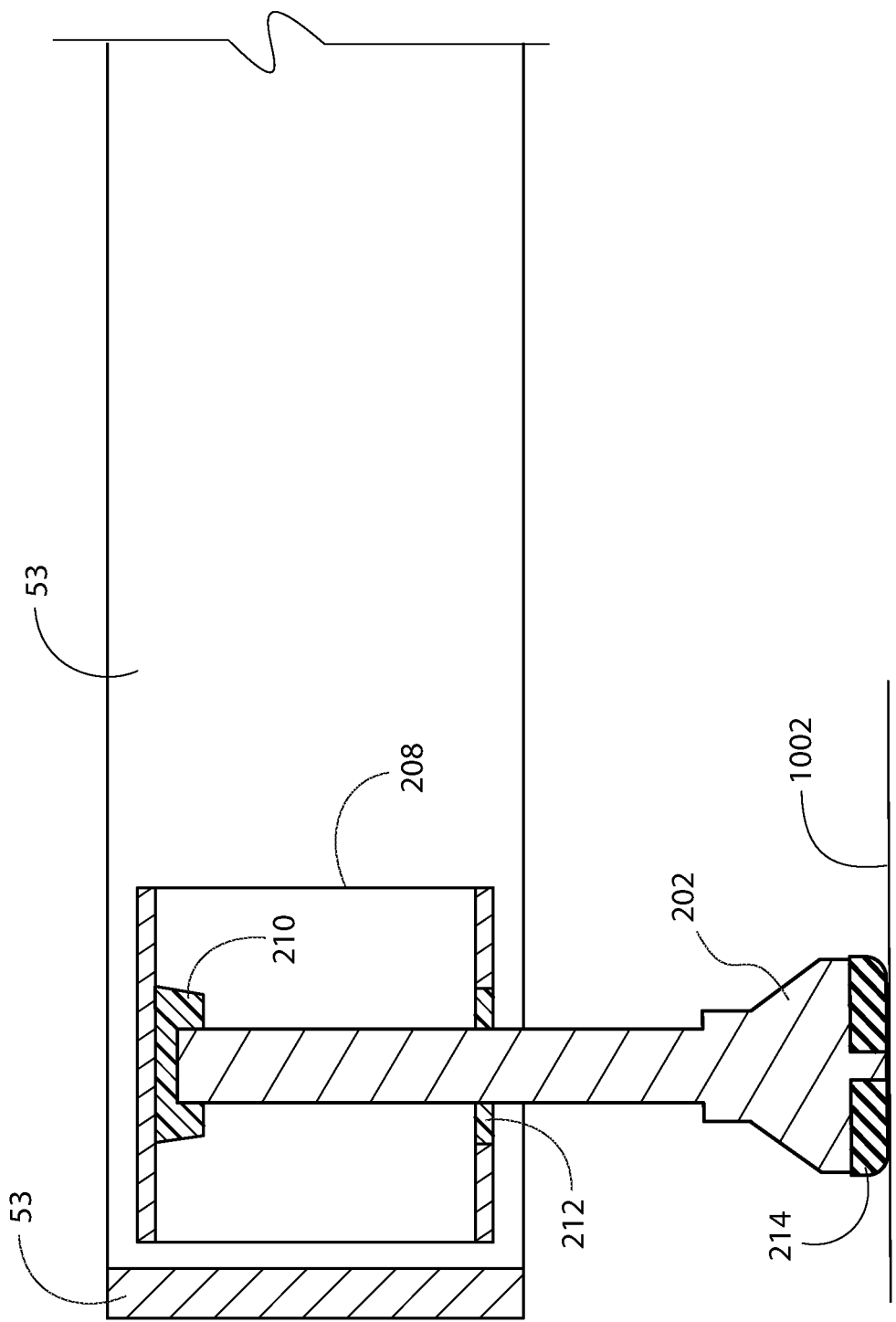
FIG. 5 provides a section view of a portion of the appliance of FIG. 3.

FIG. 5 provides an enlarged, schematic section view of a portion of the exemplary appliance 50, taken along line 5-5 in FIG. 4. In some embodiments, the second levelling leg 202 may be comprised of an electrically conductive material, such as a metal material. The chassis 53 may also be comprised of an electrically conductive material. As mentioned above, the chassis 53 may be grounded, e.g., the chassis 53 may be electrically coupled to a ground, such as ground 900 as illustrated in FIG. 3. The second levelling leg 202 may be mechanically coupled to the chassis 53 (such as via a mounting bracket 208, as illustrated in FIG. 5, and the bracket 208 may also be electrically conductive). The second levelling leg 202 may be electrically isolated from the chassis 53 (and the mounting bracket 208, in embodiments which include the mounting bracket 208) by one or more electrically insulating spacers. For example, as illustrated in FIG. 5, a first electrically insulating spacer 210 may be disposed on an intermediate portion of the second levelling leg 202 and a second electrically insulating spacer 212 may be disposed on an end of the second levelling leg 202. The electrically insulating spaces 210 and 212 may comprise any suitable material having a low electrical conductivity, e.g., rubber or plastic materials.

Figure 6:
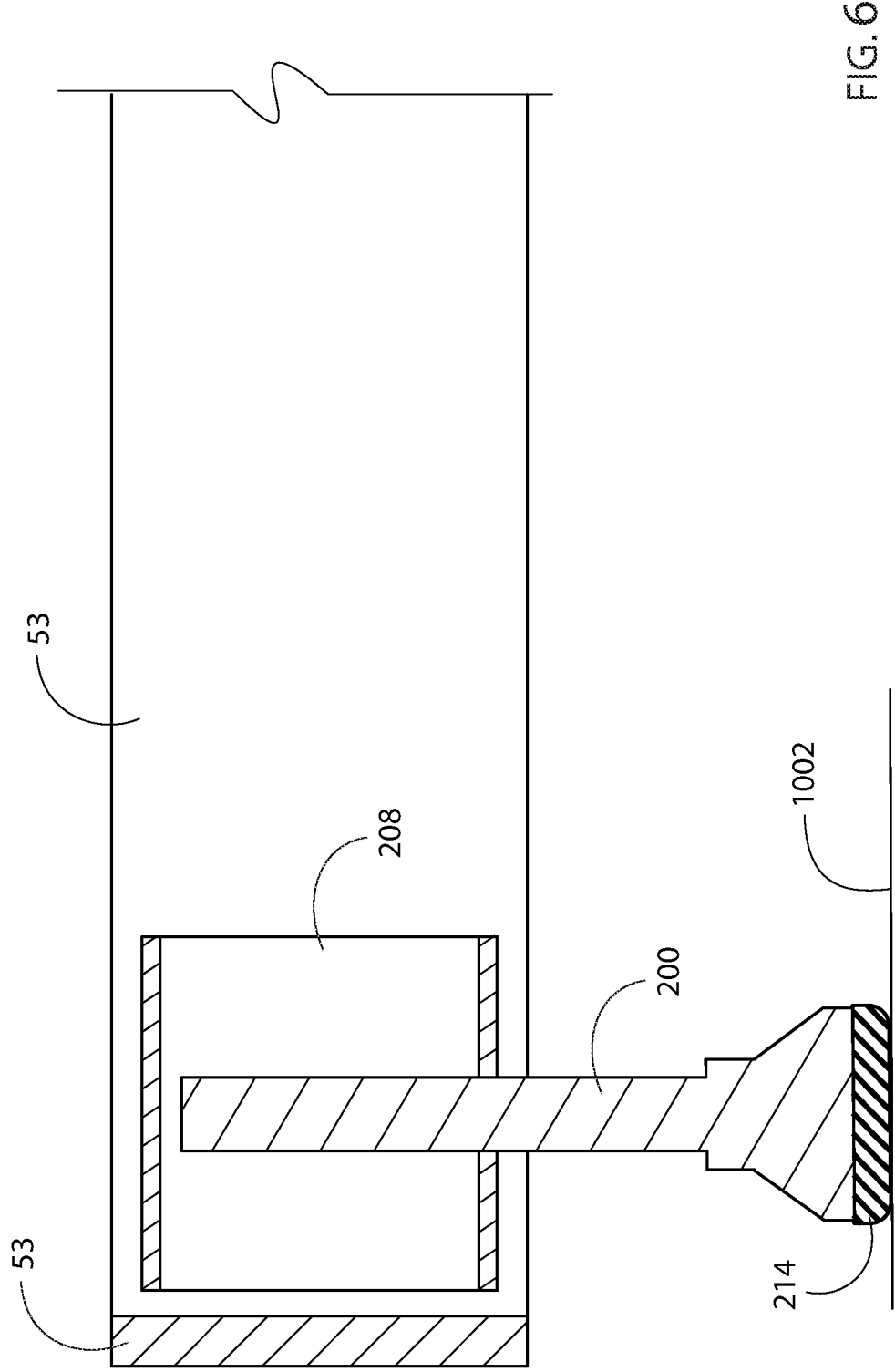
FIG. 6 provides a section view of a portion of the appliance of FIG. 3.

The first levelling leg 200 and the second levelling leg 202, as well as the third levelling leg 204 and the fourth levelling leg 206 in embodiments which include more than two legs, may extend from the cabinet 52 of the appliance 50 along the vertical direction V (See, e.g., FIG. 3), such as downward along the vertical direction V. The levelling legs 200, 202, 204, and 206 may be configured to support the appliance 50 on a base surface 1002 (FIGS. 5 and 6). The levelling legs 200, 202, 204, and 206 may be adjustably mechanically coupled to the cabinet 52, such as at the chassis 53, in order to adjust a vertical distance between the appliance 50 and the base surface 1002. For example, the levelling legs 200, 202, 204, and 206 may be threaded, such as externally threaded, and the threads on each levelling led 200, 202, 204, and 206 may be sized and configured to engage with threads, such as internal threads, on the chassis 53 and/or the mounting bracket 208. Thus, the vertical distance over which each levelling leg 200, 202, 204, and/or 206 extends downward from the cabinet 52 to the base surface 1002 may be adjusted, such as by rotating the levelling leg(s) 200, 202, 204, and/or 206, e.g., in embodiments where the levelling legs 200, 202, 204, and/or 206 are threadedly coupled to the chassis 53 and/or mounting bracket 208.

In some embodiments, for example as illustrated in FIG. 5, the second electrically insulating spacer 212 may include internal threads and the second levelling leg 202 may include external threads which are sized and configured to engage with the internal threads of the second electrically insulating spacer 212, such that the second levelling leg 202 is adjustable, as described above. The structure and function of threads, such as internal and external threads referred to herein, are well understood by those of ordinary skill in the art and, as such, the threads are not specifically illustrated in the accompanying FIGS.

In some embodiments, e.g., as illustrated in FIGS. 5 and 6, the levelling legs 200, 202, 204, and/or 206 may include feet 214 at an end of each levelling leg 200, 202, 204, and/or 206. For example, each foot 214 may be disposed at a lowermost terminus of the respective levelling leg 200, 202, 204, and/or 206 along the vertical direction V. The feet 214 may comprise a resilient material, such as rubber. In such embodiments, the feet 214 may thereby also be electrically insulating. For example, as illustrated in FIG. 6, the foot 214 electrically insulates the first levelling leg 200 from the base surface 1002. In some embodiments, the leak detecting leg, e.g., second levelling leg 202, may be in electrical communication with the base surface 1002, including any substances such as leaked water (e.g., 902 in FIG. 4) thereon. For example, as illustrated in FIG. 5, a portion of the electrically conductive material, e.g., metal, of the second levelling leg 202 may extend through the foot 214, such as a metal center core of the foot 214.

In various embodiments, when the leaked water 902 (FIG. 4) contacts a metal or other electrically conductive portion of the second levelling leg 202 and contacts a metal or other electrically conductive portion of the first levelling leg 200 (and/or at least one of the first levelling leg 200, the third levelling leg 204 and the fourth levelling leg 206 in embodiments including such legs), electrical continuity between the second levelling leg 202 and the chassis 53 is established via the leaked water 902 and the at least one other levelling leg 200, 204, and/or 206. In the absence of leaked water 902, the second levelling leg 202 is not in electrical continuity with the chassis 53 due to the electrical isolation of the second levelling leg 202, such as by the electrically insulating spaces 210 and 212. Thus, when electrical continuity between the second levelling leg 202 and the chassis 53 is detected, a leak may also be detected.

As shown in FIG. 6, the first levelling leg 200 may be directly connected to the chassis 53 and/or the mounting bracket 208 of the chassis 53. For example, the first levelling leg 200 may be directly connected without any spacers or other intervening structures, such as without the electrically insulating spacers 201 and 212 associated with the second levelling leg 202 (FIG. 5). Thus, where the first levelling leg 200 comprises electrically conductive material and the chassis 53, including the mounting bracket 208 thereof, also comprises electrically conductive material, the first levelling leg 200 is electrically coupled to the chassis 53 by the direct physical connection with continuous contact between electrically conductive materials of each component.

Figure 7:
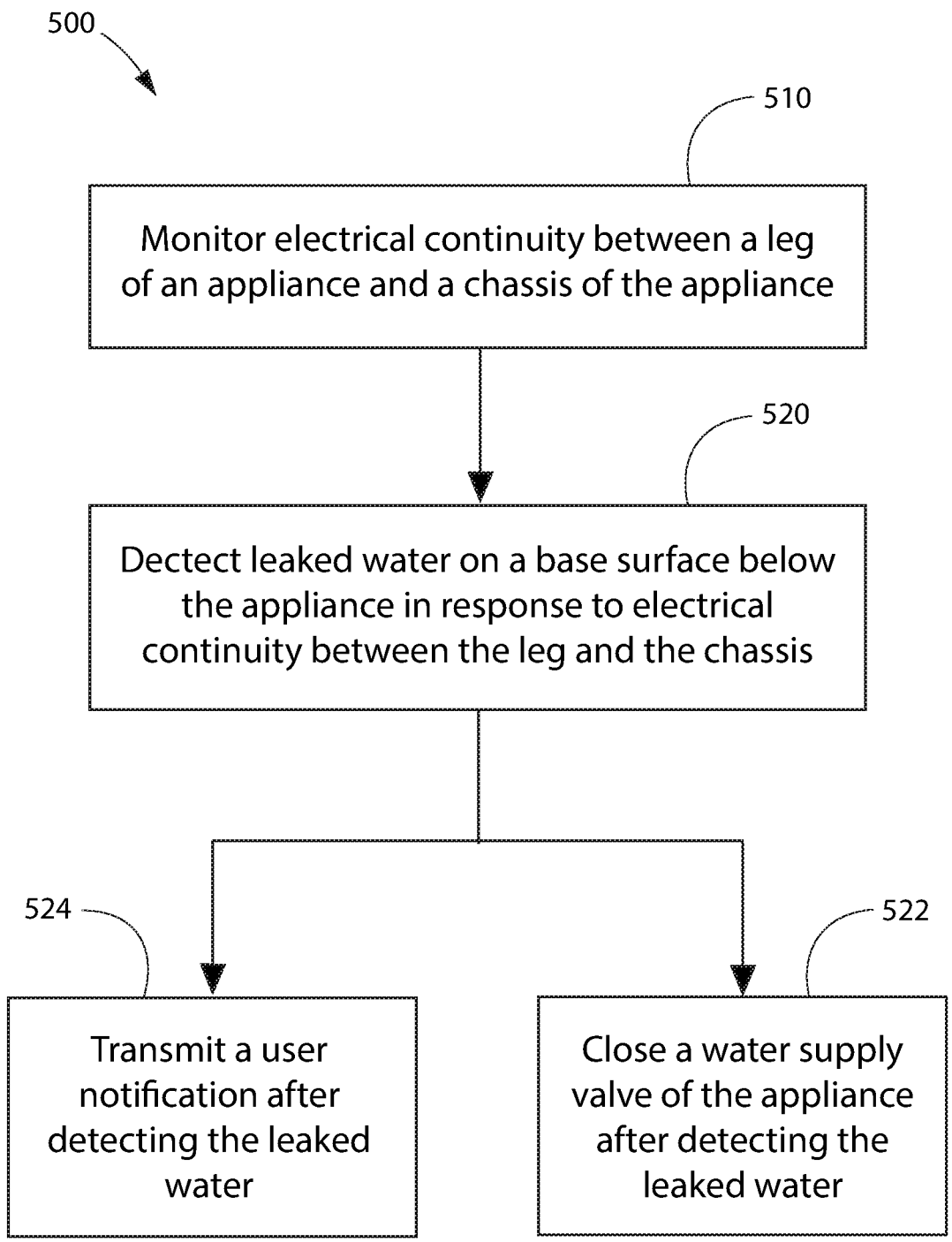
FIG. 7 provides a flow chart illustrating a method of detecting a leak from an appliance in accordance with one or more example embodiments of the present disclosure.

Embodiments of the present disclosure include methods of detecting a leak from an appliance, such as the exemplary appliances 50 described above. An exemplary method 500 of detecting a leak from an appliance according to one or more embodiments of the present disclosure is illustrated in FIG. 7. In some embodiments, e.g., as illustrated in FIG. 7, the method 500 may include a step 510 of monitoring electrical continuity between a leg of an appliance and a chassis of the appliance. For example, the leg may be a levelling leg, such as the second levelling leg 202 described above, which is electrically insulated from the chassis, which may be a grounded chassis, such as the chassis 53 described herein. Thus, electrical continuity may be present between the leg and the chassis when a circuit is completed between the leg and the chassis due to the presence of water (e.g., with solutes such as electrolytes therein, such as water typically provided in a domestic water supply and/or used in a domestic appliance such as a washing machine or dishwasher) between the electrically insulated leg and at least one other leg of the appliance. For example, in some embodiments, the method 500 may include a step 520 of detecting water on a base surface, e.g., the base surface 1002 described above, in response to, e.g., because of, electrical continuity between the leg, e.g., second levelling leg 202, and the chassis. Additionally, it should be noted that references to "domestic" appliances herein are not intended to exclude, e.g., washing machines in a laundromat, apartment building, hotel, dormitory, etc., or dishwasher appliances in a commercial kitchen or other commercial/industrial setting.

Continuing with method 500 illustrated in FIG. 7, in at least some embodiments, the method 500 may also include one or more actions after detecting the leak, such as to mitigate potential effects of the leak. For example, in some embodiments, the method 500 may also include closing a water supply valve of the appliance after detecting leaked water on the base surface, e.g., as illustrated at step 522 in FIG. 7. As another example, in some embodiments, the method 500 may also include transmitting a user notification, e.g., to a display on the appliance and/or to a remote user interface device, after detecting leaked water on the base surface, e.g., as illustrated at step 524 in FIG. 7.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
a chassis comprising an electrically conductive material, the chassis electrically coupled to a ground;
a first levelling leg comprising an electrically conductive material, the first levelling leg electrically coupled to the chassis and configured to support the appliance on a base surface;
a second levelling leg comprising an electrically conductive material, the second levelling leg electrically isolated from the chassis by one or more electrically insulating spacers and configured to support the appliance on the base surface; and
a controller in operative communication with the second levelling leg and the chassis, the controller configured for:
monitoring electrical continuity between the second levelling leg and the chassis; and
detecting water on the base surface in response to electrical continuity between the second levelling leg and the chassis.

2. The appliance of claim 1, wherein the appliance comprises a water supply valve, and the controller is further configured for closing the water supply valve after detecting water on the base surface.

3. The appliance of claim 1, wherein the controller is further configured for transmitting a user notification after detecting water on the base surface.

4. The appliance of claim 3, further comprising a display, wherein the controller is configured to transmit the user notification to the display.

5. The appliance of claim 3, wherein the controller is configured to communicate wirelessly with a remote user interface device, and wherein the controller is configured to transmit the user notification to the remote user interface device.

6. The appliance of claim 1, wherein the second levelling leg is mechanically coupled to the chassis.

7. The appliance of claim 1, further comprising a third levelling leg and a fourth levelling leg, the third levelling leg and the fourth levelling leg each comprising an electrically conductive material and electrically coupled to the chassis, wherein the controller is configured for detecting water on the base surface in response to electrical continuity between the second levelling leg and any one or more of the first levelling leg, the third levelling leg, and/or the fourth levelling leg.

8. The appliance of claim 1, wherein the second levelling leg is configured for electrical communication with the base surface.

9. The appliance of claim 1, wherein the appliance is a washing machine appliance comprising a housing mounted on the chassis and a tub positioned within the housing, the tub configured for receiving a wash volume of water for washing articles therein.

10. A method of detecting a leak from an appliance, the appliance comprising an electrically conductive chassis electrically coupled to a ground, a first levelling leg electrically coupled to the chassis and configured to support the appliance on a base surface, and a second levelling leg comprising an electrically conductive material, the second leveling leg electrically isolated from the chassis by one or more electrically insulating spacers and configured to support the appliance on the base surface, the method comprising:

monitoring electrical continuity between the second levelling leg and the chassis; and detecting water on the base surface in response to electrical continuity between the second levelling leg and the chassis.

11. The method of claim 10, wherein the appliance comprises a water supply valve, further comprising closing the water supply valve after detecting water on the base surface.

12. The method of claim 10, further comprising transmitting a user notification after detecting water on the base surface.

13. The method of claim 12, wherein transmitting the user notification after detecting water on the base surface comprises transmitting the user notification to a display on the appliance.

14. The method of claim 12, wherein transmitting the user notification after detecting water on the base surface comprises wirelessly transmitting the user notification to a remote user interface device.

15. The method of claim 10, wherein the second levelling leg is mechanically coupled to the chassis.

16. The method of claim 10, wherein the appliance further comprises a third levelling leg and a fourth levelling leg, the third levelling leg and the fourth levelling leg each comprising an electrically conductive material and electrically coupled to the chassis, wherein detecting water on the base surface comprises detecting water between the second levelling leg and any one or more of the first levelling leg, the third levelling leg, and/or the fourth levelling leg.

17. The method of claim 10, wherein the second levelling leg is in electrical communication with the base surface.

18. The method of claim 10, wherein the appliance is a washing machine appliance comprising a housing mounted on the chassis and a tub positioned within the housing, the tub configured for receiving a wash volume of water for washing articles therein, and wherein the step of monitoring electrical continuity between the second levelling leg and the chassis is performed during an operation cycle of the washing machine appliance.

* * * * *